United States Patent
Hsieh

(10) Patent No.: US 8,991,266 B2
(45) Date of Patent: Mar. 31, 2015

(54) THREADED MEMBER CAPABLE OF DETECTING TIGHTENING FORCE

(71) Applicant: Kabo Tool Company, Taichung (TW)

(72) Inventor: Chih-Ching Hsieh, Taichung (TW)

(73) Assignee: Kabo Tool Company, Taichung (TW)

( * ) Notice: Subject to any disclaimer, the term of this patent is extended or adjusted under 35 U.S.C. 154(b) by 0 days.

(21) Appl. No.: 14/160,910

(22) Filed: Jan. 22, 2014

(65) Prior Publication Data

US 2014/0251027 A1    Sep. 11, 2014

(30) Foreign Application Priority Data

Mar. 6, 2013  (TW) .............................. 102107903 A

(51) Int. Cl.
  *B25B 23/14*  (2006.01)
  *G01L 5/24*  (2006.01)
  *F16B 31/02*  (2006.01)

(52) U.S. Cl.
  CPC .. *G01L 5/24* (2013.01); *F16B 31/02* (2013.01)
  USPC ..................... 73/862.21; 73/862.22

(58) Field of Classification Search
  USPC ....................................... 73/862.21
  See application file for complete search history.

(56) References Cited

U.S. PATENT DOCUMENTS

| | | | | |
|---|---|---|---|---|
| 3,285,120 A | * | 11/1966 | Kartiala | 411/8 |
| 3,417,611 A | * | 12/1968 | Brooks et al. | 73/862.29 |
| 4,773,272 A | * | 9/1988 | Trungold | 73/761 |
| 5,370,483 A | * | 12/1994 | Hood et al. | 411/10 |
| 5,385,054 A | * | 1/1995 | Kramer | 73/761 |
| 2007/0017295 A1 | * | 1/2007 | Ohta et al. | 73/761 |
| 2010/0054891 A1 | * | 3/2010 | Nishida et al. | 411/9 |
| 2012/0191378 A1 | * | 7/2012 | Chu et al. | 702/41 |

FOREIGN PATENT DOCUMENTS

TW    I 310810    6/2009

* cited by examiner

*Primary Examiner* — Lisa Caputo
*Assistant Examiner* — Jamel Williams
(74) *Attorney, Agent, or Firm* — Guice Patents PLLC

(57) ABSTRACT

A threaded member capable of detecting tightening force includes a head section, a threaded rod section and at least one strain sensor. The head section has a bottom face, a skirt section and a receiving space. The threaded rod section is disposed under the bottom face of the head section. A sink section is formed on the bottom face of the head section. The strain sensor is disposed on the bottom face of the head section and positioned in the receiving space. Due to the sink section, when the head section is strained and deformed, the strain sensor can sensitively and precisely detect the strain capacity of the head section and provide the tightening force of the threaded member for a user to more precisely tighten the threaded member.

15 Claims, 5 Drawing Sheets

THREADED MEMBER CAPABLE OF DETECTING TIGHTENING FORCE

BACKGROUND OF THE INVENTION

1. Field of the Invention

The present invention relates generally to a threaded member capable of detecting tightening force, and more particularly to a threaded member, which has higher strain sensitivity for more precisely detecting the tightening extent of the threaded member.

2. Description of the Related Art

A threaded member is used to tighten a work piece. In engineering, a threaded member is often used to tighten or connect two or more articles with each other. In simple practice, the threaded member is only tightened without noting the tightening torque applied to the threaded member.

However, when the threaded member is applied to a current large-scale building, sophisticated building, sophisticated equipment or highly stressed site, in the case that the threaded member is over-tightened or under-tightened, the structural strength of the building and the operation effect of the mechanical equipment will be affected. This will even threaten the security of lives and properties of users. Therefore, when tightened, the tightening extent of the threaded member must be monitored, measured and recorded so as to ensure safety.

In order to achieve the above object, the applicant's Taiwan Patent No. I310810 discloses an engineering threaded member capable of showing torque value as shown in FIGS. 1 and 2. The threaded member includes a threaded member A10 and a torque measuring unit A20. The threaded member A10 has a head section A11 and a threaded rod section A12. The torque measuring unit A20 is disposed on the head section A11, having a processing/display unit A21 and a sensor A22 for detecting the deformation of the head section A11. When the threaded member A10 is tightened, the sensor A22 detects the deformation of the head section and transmits a signal to the processing/display unit A21 to display the tightening force applied to the threaded member A10.

The above patent enables a user to read the tightening extent of the threaded member. However, the sensitivity of the threaded member is insufficient. This is because when the threaded member A10 is tightened with a locked article as shown in FIG. 2, the head section A11 is in contact with the locked article. The head section A11 of the threaded member is a solid body so that the deformation of the head section is small. The sensor A22 can detect the deformation and find the tightening torque only when the head section is deformed to a certain extent. Therefore, the conventional threaded member A10 can hardly sensitively and precisely detect the deformation extent so that it is hard for a user to read a precise tightening torque.

It is therefore tried by the applicant to further provide a threaded member capable of detecting tightening force, which has higher strain sensitivity for more precisely detecting the tightening torque of the threaded member so as to ensure safety.

SUMMARY OF THE INVENTION

It is therefore a primary object of the present invention to provide a threaded member capable of detecting tightening force. A sink section is formed between the head section and threaded rod section of the threaded member. When a tightening force is applied to the head section to strain the head section relative to the threaded rod section, due to the sink section, the head section is easier to deform than the conventional threaded member so that the strain capacity of the head section can be sensitively detected. Accordingly, a strain sensor (such as a strain gauge or a tension gauge) can immediately and precisely detect the strain extent of the threaded member to provide a true tightening torque value for a user to ensure safety.

To achieve the above and other objects, the threaded member capable of detecting tightening force of the present invention includes a head section, a threaded rod section and a strain sensor. The head section has a bottom face and a skirt section downward protruding from the bottom face. A receiving space is formed between the bottom face of the head section and the skirt section. The threaded rod section is disposed under the bottom face of the head section. A sink section is formed on the bottom face of the head section between the threaded rod section and the head section. The strain sensor (such as a strain gauge or a tension gauge) is disposed on the bottom face of the head section and positioned in the receiving space.

Accordingly, due to the sink section, when the head section of the threaded member is deformed under the tightening force, the strain capacity of the threaded member is enlarged to enhance the strain sensitivity thereof. In this case, the strain sensor can precisely detect the tightening extent of the head section to provide a true tightening torque value for a user to ensure safety.

The present invention can be best understood through the following description and accompanying drawings, wherein:

DETAILED DESCRIPTION OF THE PREFERRED EMBODIMENTS

Figure 1:
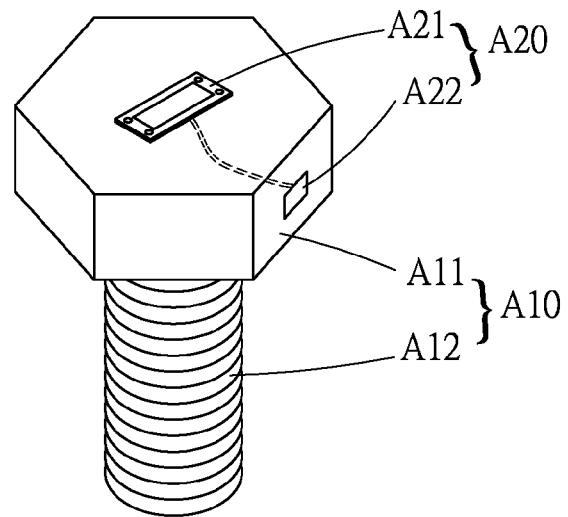
FIG. 1 is a perspective view of a conventional threaded member.
Figure 2:
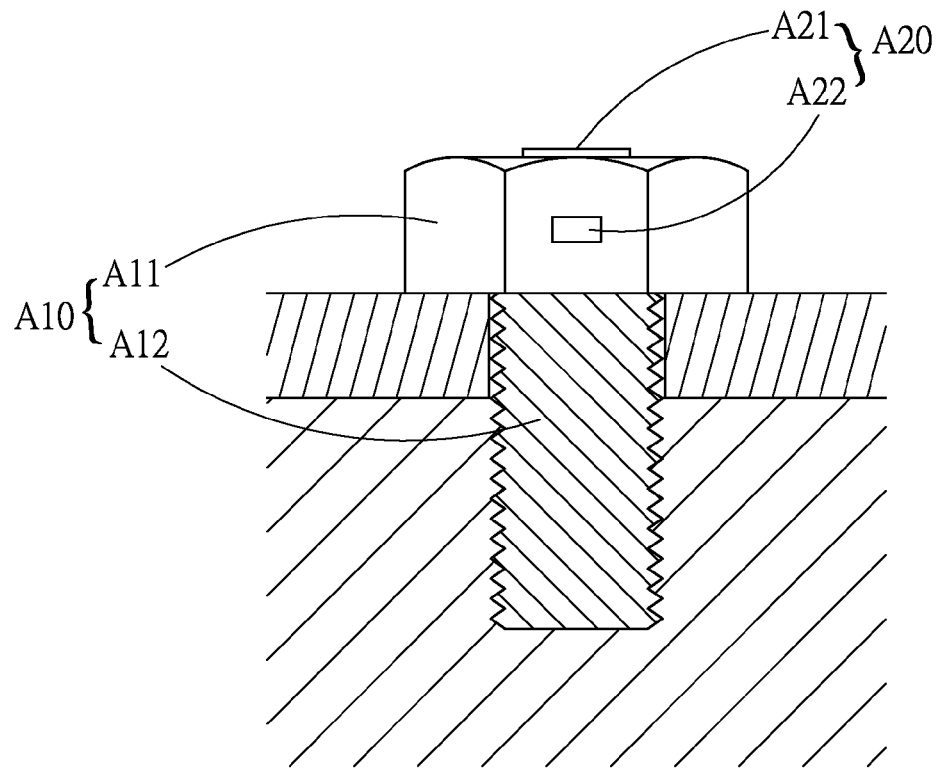
FIG. 2 is a sectional view of the threaded member according to FIG. 1, showing that the threaded member is tightened with a locked article.
Figure 3:
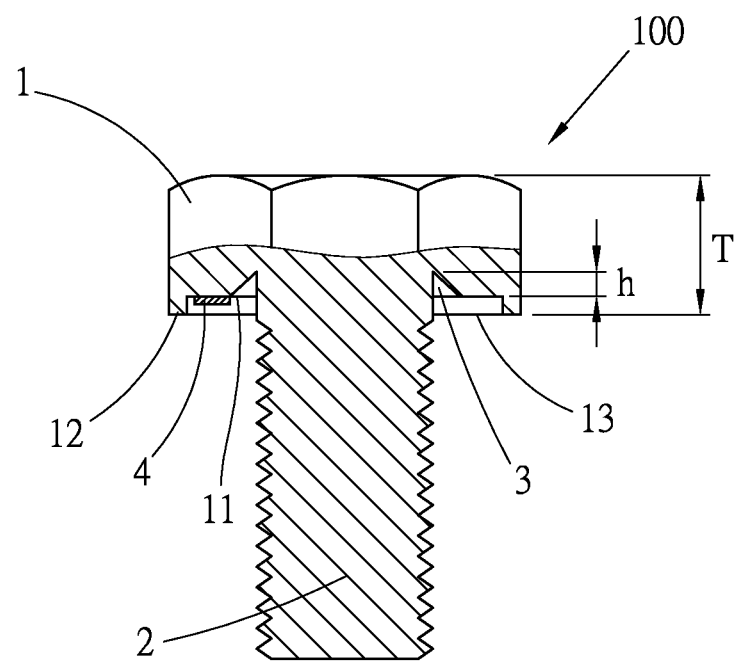
FIG. 3 is a front partially sectional view of a first embodiment of the present invention.
Figure 4:
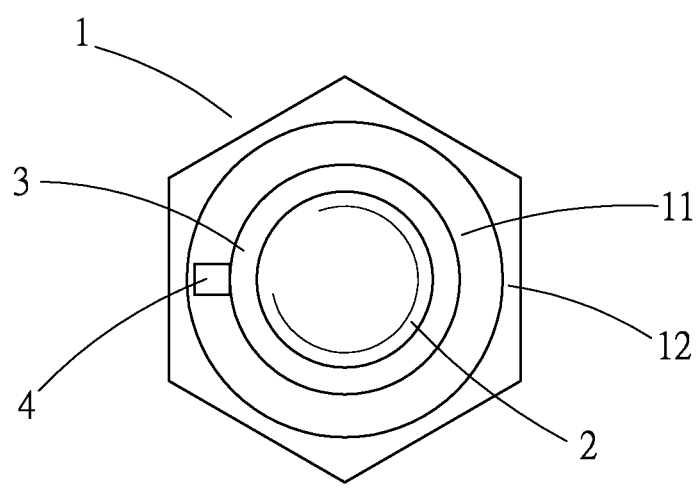
FIG. 4 is a bottom view according to FIG. 3.

Please refer to FIGS. 3 and 4. According to a first embodiment, the threaded member 100 of the present invention includes a head section 1, a threaded rod section 2 and a strain sensor 4. The head section 1 has a bottom face 11 and a skirt section 12 downward protruding from a periphery of the bottom face 11. The skirt section 12 is formed along the periphery of the bottom face 11. A receiving space 13 is formed under the head section 1 between the skirt section 12 and the bottom face 11. The threaded rod section 2 is disposed at a center of the bottom face 11 of the head section 1. A thread is formed on outer circumference of the threaded rod section 2.

Figure 6:
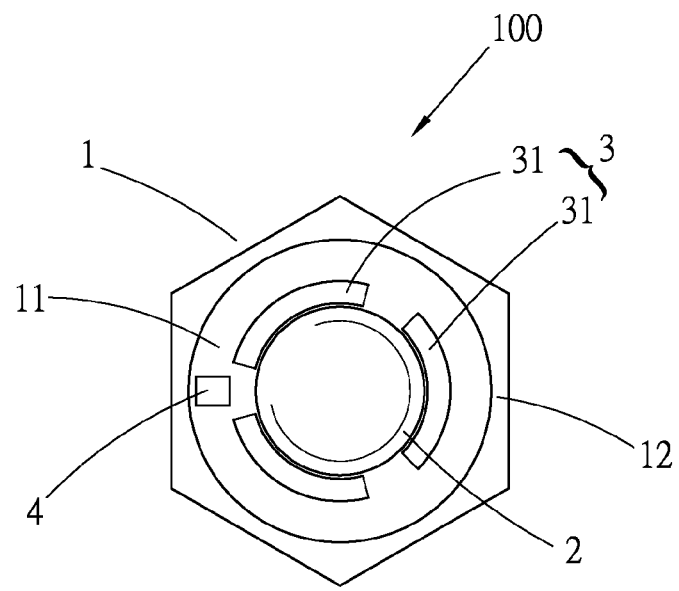
FIG. 6 is a bottom view of a second embodiment of the present invention.

A sink section 3 is formed on the bottom face 11 of the head section 1 in adjacency to the threaded rod section 2. The bottom face 11 is inward recessed from the receiving space 13 to form the sink section 3. In this embodiment, the sink section 3 is, but not limited to, an annular groove. For example, the bottom face 11 of the head section 1 is recessed to form a conic annular groove as shown in FIG. 4. Preferably, the sink section 3 has a depth h 10~35% of a thickness T of the head section 1. Accordingly, while having a sufficient structural strength, the threaded member 100 is easy to strain. Please refer to FIG. 6. Alternatively, the sink section 3 can be composed of multiple recesses 31 formed on the bottom face 11 of the head section 1. The recesses 31 can have a geometrical form such as an arched form or a strip form. The cross section of the recesses 31 can be semicircular, triangular, square or rectangular. Preferably, the recesses 31 are annularly arranged on the bottom face 11 of the head section around the threaded rod section 2 to enhance the straining effect of the head section 1. For example, two to four recesses 31 are annularly arranged on the bottom face 11 at equal intervals in immediate adjacency to the threaded rod section 2. Accordingly, when a tightening force is applied to the head section 1 to strain the head section 1, the sink section 3 can increase the strain capacity of the head section 1 to precisely indicate the strain capacity of the head section 1. Therefore, the strain sensitivity is enhanced.

The strain sensor 4 can be a strain gauge, a tension gauge or a sensation element equipped with a chip. The strain sensor 4 serves to detect the strain capacity of the sink section 3 so as to obtain a precise tightening torque value. The strain sensor 4 is fixedly disposed on the bottom face 11 of the head section 1 and received in the receiving space 13. The bottom face 11 serves as a plane for arranging the strain sensor 4 thereon. The strain sensor 4 has wireless transmission function, whereby the detected strain torque value is transmitted to an external device (not shown). The strain sensor 4 can be a strain sensor with radio frequency identification (RFID) function, an infrared strain sensor, a Bluetooth strain sensor or a near field communication (NFC) strain sensor for providing short-distance high-frequency wireless communication. Alternatively, the strain sensor 4 can be connected with a wire to transmit signal or information in a wired manner. The head section is formed with a perforation for conducting the wire therethrough.

Figure 5:
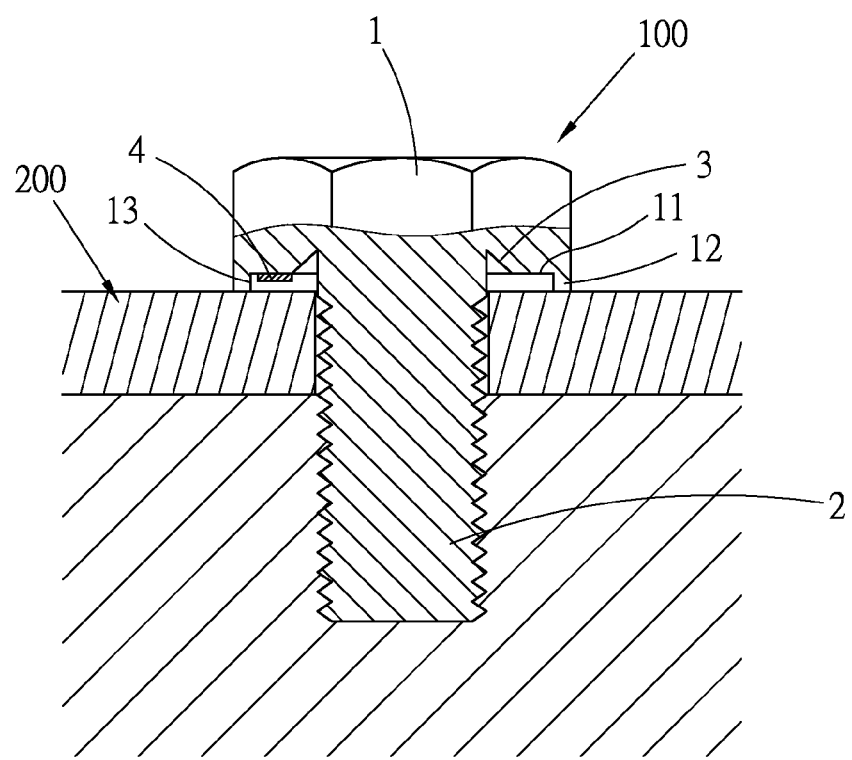
FIG. 5 is a sectional view of the first embodiment of the present invention, showing that the threaded member is tightened with a locked article.

In addition, the height of the skirt section 12 of the head section 1 is larger than the thickness of the strain sensor 4. When the threaded member 100 is tightened with a locked article 200 (as shown in FIG. 5), the strain sensor 4 will not contact the locked article 200. Therefore, the strain sensor 4 is prevented from being damaged.

As shown in FIG. 5, in use of the present invention, the locked article 200 is fixed in a specific position. When the threaded member 100 is wrenched and tightened, the skirt section 12 of the head section 1 contacts the locked article 200 to strain the head section 1. Due to the sink section 3, the head section 1 is easier to deform than the conventional threaded member so that the strain capacity of the head section 1 is enlarged. The strain sensor 4 is disposed on the bottom face 11 near the sink section 3, whereby the strain sensor 4 can immediately and sensitively detect the change of the force applied to the head section 1 and the deformation of the head section 1. Accordingly, the strain value of the threaded member can be sensitively and precisely detected and the detected data can be wirelessly transmitted to an external device (not shown) for a user to real-time read the tightening force (tightening torque) of the threaded member 100. Moreover, after tightened, the user can monitor the state of the threaded member according to the read data so as to ensure safety.

Figure 7:
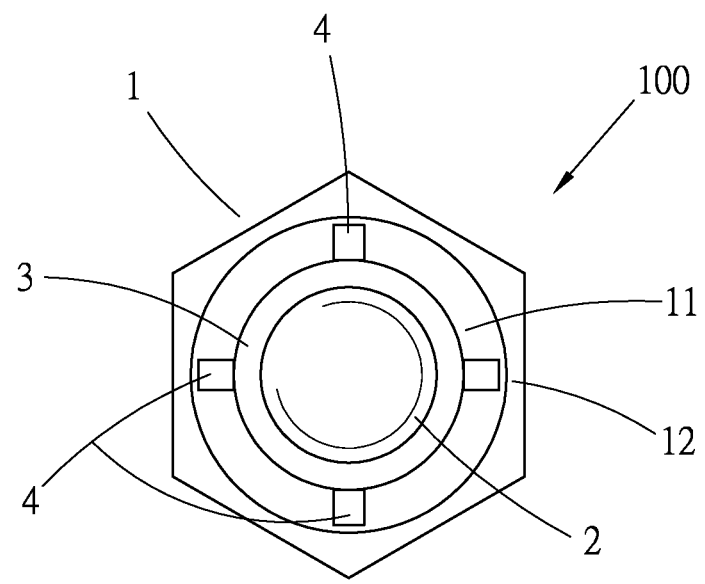
FIG. 7 is a bottom view of a third embodiment of the present invention.

Please now refer to FIG. 7, which is a bottom view of a third embodiment of the threaded member of the present invention. In this embodiment, the threaded member 100 also includes a head section 1, a threaded rod section 2 and a sink section 3 formed between the head section 1 and the threaded rod section 2. The head section 1 also has a bottom face 11, a skirt section 12 and a receiving space 13. The third embodiment is different from the first embodiment in that the third embodiment includes multiple strain sensors 4, for example, four strain sensors. The strain sensors 4 are annularly arranged on the bottom face 11 of the head section 1 at intervals. The respective strain sensors 4 are positioned in different directions for detecting the deformation extents of the head section 1 in different directions. In this case, the strain sensors 4 can immediately provide the tightened state of the threaded member in different angular positions so as to achieve more precise detection result.

Figure 8:
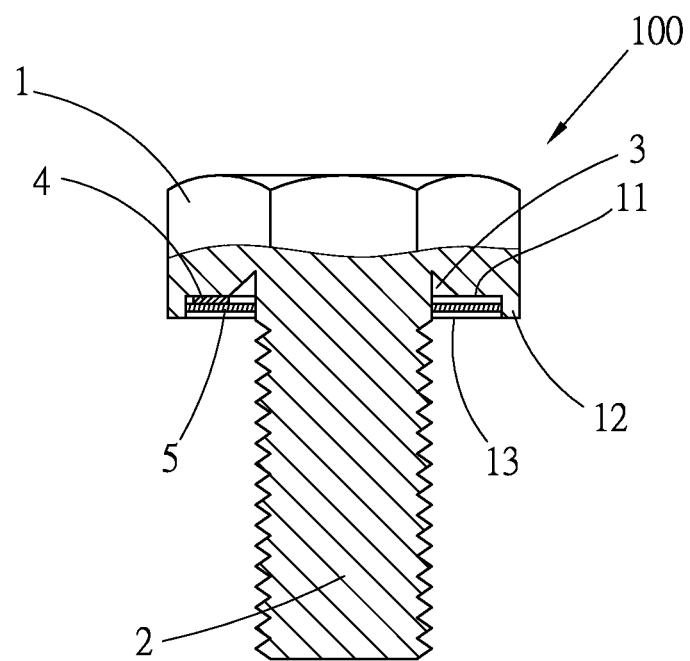
FIG. 8 is a front partially sectional view of a fourth embodiment of the present invention.

Please now refer to FIG. 8, which is a front view of a fourth embodiment of the threaded member of the present invention. The same components and structures of the fourth embodiment as the first embodiment will not be repeatedly described hereinafter. The fourth embodiment is different from the first embodiment in that the fourth embodiment further includes a protection plate 5 received in the receiving space 13 between the skirt section 12 and the bottom face 11. The protection plate 5 serves to provide dustproof, anti-contamination and dampproof effect so as to protect the strain sensor 4. After the protection plate 5 is mounted into the receiving space 13, the bottom face of the protection plate 5 will not protrude from the bottom face of the skirt section 12.

Figure 9:
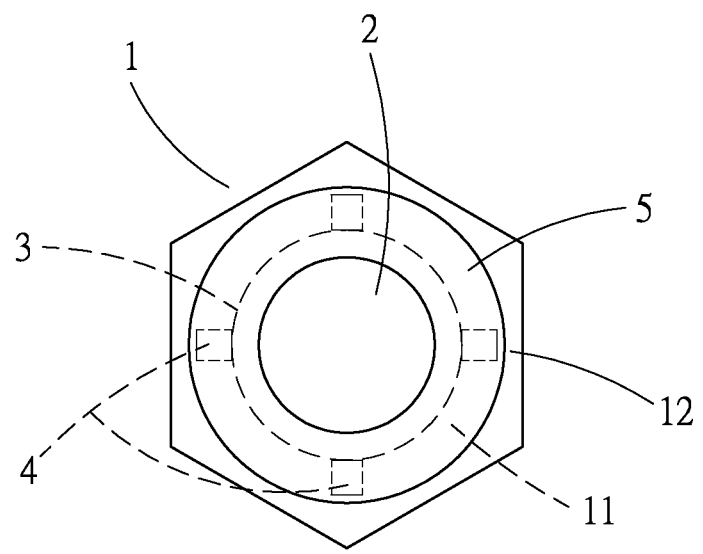
FIG. 9 is a bottom view of a fifth embodiment of the present invention.

Please now refer to FIG. 9, which is a bottom view of a fifth embodiment of the threaded member of the present invention. The same components and structures of the fifth embodiment as the first embodiment will not be repeatedly described hereinafter. The fifth embodiment is different from the first embodiment in that the fifth embodiment includes four strain sensors 4 arranged on the bottom face 11 of the head section 1 at intervals. The respective strain sensors 4 are positioned in different directions for detecting the deformation of the head section 1 in different directions. In this case, the strain sensors 4 can provide the data of the tightened extents of the threaded member in different angular positions so as to achieve more precise detection result. In addition, a protection plate 5 is disposed in the receiving space 13 to provide dustproof, anti-contamination and dampproof effect so as to protect the strain sensors 4.

According to the above arrangement, the sink section is formed between the head section and the threaded rod section and at least one strain sensor is disposed on the bottom face of the head section to sensitively and precisely detect the tightening torque of the threaded member. The strain sensor further transmits the data of tightening torque to a user for the user to monitor the tightened state of the threaded member so as to ensure safety.

The above embodiments are only used to illustrate the present invention, not intended to limit the scope thereof. Many modifications of the above embodiments can be made without departing from the spirit of the present invention.

What is claimed is:

1. A threaded member capable of detecting tightening force, comprising:
   a head section having a bottom face and a skirt section downward protruding from a periphery of the bottom face; a receiving space being formed between the skirt section and the bottom face of the head section;

a threaded rod section disposed under the bottom face of the head section;

a sink section formed on the bottom face of the head section; and at least one strain sensor disposed on the bottom face of the head section and positioned in the receiving space; whereby due to the sink section, when the head section is strained and deformed, the strain sensor can sensitively detect the strain capacity of the head section;

wherein the sink section is an annular groove in adjacency to the threaded rod section.

2. The threaded member as claimed in claim 1, wherein the bottom face of the head section is inward recessed from the receiving space to form the sink section.

3. The threaded member as claimed in claim 1, wherein the sink section is a conic annular groove.

4. The threaded member as claimed in claim 1, wherein the sink section has a depth 10~35% of a thickness of the head section.

5. The threaded member as claimed in claim 1, further comprising a protection plate received in the receiving space.

6. The threaded member as claimed in claim 1, wherein there are multiple strain sensors disposed on the bottom face of the head section at intervals.

7. The threaded member as claimed in claim 1, wherein the strain sensor serves to wirelessly transmit data.

8. The threaded member as claimed in claim 1, wherein the strain sensor is selected from a group consisting of radio frequency identification (RFID) strain sensor, infrared strain sensor, Bluetooth strain sensor and near field communication (NFC) strain sensor.

9. A threaded member capable of detecting tightening force, comprising:

a head section having a bottom face and a skirt section downward protruding from a periphery of the bottom face; a receiving space being formed between the skirt section and the bottom face of the head section;

a threaded rod section disposed under the bottom face of the head section;

a sink section formed on the bottom face of the head section; and at least one strain sensor disposed on the bottom face of the head section and positioned in the receiving space; whereby due to the sink section, when the head section is strained and deformed, the strain sensor can sensitively detect the strain capacity of the head section;

wherein the sink section is composed of multiple recesses, the recesses are annularly arranged on the bottom face of the head section around the threaded rod section at intervals.

10. The threaded member as claimed in claim 9, further comprising a protection plate received in the receiving space.

11. The threaded member as claimed in claim 9, wherein there are multiple strain sensors disposed on the bottom face of the head section at intervals.

12. The threaded member as claimed in claim 9, wherein the bottom face of the head section is inward recessed from the receiving space to form the sink section.

13. The threaded member as claimed in claim 9, wherein the sink section has a depth 10-35% of a thickness of the head section.

14. The threaded member as claimed in claim 9, wherein the strain sensor serves to wirelessly transmit data.

15. The threaded member as claimed in claim 9, wherein the strain sensor is selected from a group consisting of radio frequency identification (RFID) strain sensor, infrared strain sensor, Bluetooth strain sensor and near field communication (NFC) strain sensor.

\* \* \* \* \*